US005525845A

United States Patent [19]
Beale et al.

[11] Patent Number: 5,525,845
[45] Date of Patent: Jun. 11, 1996

[54] FLUID BEARING WITH COMPLIANT LINKAGE FOR CENTERING RECIPROCATING BODIES

[75] Inventors: William T. Beale; Nicholas R. van der Walt; Reuven Z. Unger, all of Athens, Ohio

[73] Assignee: Sunpower, Inc., Athens, Ohio

[21] Appl. No.: 214,984

[22] Filed: Mar. 21, 1994

[51] Int. Cl.$^6$ .................................................. H02K 33/00
[52] U.S. Cl. ........................... 310/30; 310/12; 310/15; 310/90
[58] Field of Search ................... 310/90.5, 90, 12, 310/15, 30; 92/137; 417/363, 416, 417, 437

[56] References Cited

U.S. PATENT DOCUMENTS

| | | | |
|---|---|---|---|
| 2,907,304 | 10/1959 | Macks | 121/38 |
| 3,127,955 | 4/1964 | Macks | 184/18 |
| 3,937,600 | 2/1976 | White | 417/416 |
| 3,947,155 | 3/1976 | Bidol | 417/417 |
| 4,036,018 | 7/1977 | Beale | 60/520 |
| 4,179,630 | 12/1979 | Stuber | 310/15 |
| 4,346,318 | 8/1982 | Shtrikman | 310/12 |
| 4,349,757 | 9/1982 | Bhate | 310/15 |
| 4,353,220 | 10/1982 | Curwen et al. | 62/228 |
| 4,454,426 | 6/1984 | Benson | 290/1 R |
| 4,538,964 | 9/1985 | Brown | 417/267 |
| 4,545,738 | 10/1985 | Young | 417/53 |
| 4,602,174 | 7/1986 | Redlich | 310/15 |
| 4,623,808 | 11/1986 | Beale et al. | 310/15 |
| 4,644,851 | 2/1987 | Young | 92/127 |
| 4,649,283 | 3/1987 | Berchowitz et al. | 290/1 R |
| 4,721,440 | 1/1988 | Hurst | 417/371 |
| 4,836,757 | 6/1989 | Curwen et al. | 417/416 |
| 4,862,695 | 9/1989 | Kushnir | 62/6 |
| 4,894,996 | 1/1990 | Kazumoto et al. | 62/6 |
| 5,084,643 | 1/1992 | Chen | 310/90.5 |
| 5,455,472 | 10/1995 | Weiss et al. | 310/90.5 |

OTHER PUBLICATIONS

*Design of Aerostatic Bearings* by J. W. Powell, The Machinery Publishing Co., Ltd., London, 1970.

Primary Examiner—Steven L. Stephan
Assistant Examiner—Judson H. Jones
Attorney, Agent, or Firm—Frank H. Foster; Kremblas, Foster, Millard & Pollick

[57] ABSTRACT

An improved mechanical transducer of the type having a body reciprocating in a chamber, the body being linked to a housing by a linkage including an axially compliant spring. An anti-friction fluid bearing applies a lateral centering force upon the body and a linkage component of the linkage has a lateral compliance sufficient for the centering forces exerted by the fluid bearing to at least equal the sum of lateral force exerted by the linkage and other lateral forces exerted upon the body. That lateral compliance allows the centering forces of the fluid bearing to be effective in moving the body away from the chamber wall and thereby minimize contact and consequent wear of the interfacing surfaces between the body and the chamber wall.

14 Claims, 9 Drawing Sheets

FLUID BEARING WITH COMPLIANT LINKAGE FOR CENTERING RECIPROCATING BODIES

TECHNICAL FIELD

This invention relates generally to thermomechanical or electromechanical transducers of the type in which one or more sprung, oscillating bodies reciprocates along an axis of geometric symmetry and is particularly advantageous for use in free-piston Stirling engines with linear alternators, free-piston Stirling coolers with linear motors, free-cylinder water pumps, and free-piston compressors with linear motors.

BACKGROUND ART

The misalignment of parts in thermomechanical and electromechanical transducers having one or more sprung, oscillating bodies causes these bodies to reciprocate along an axis other than the axis of geometric symmetry. The actual axis of reciprocation may be parallel but is generally not parallel to the geometric axis. Such misalignments arise routinely in the manufacturing and assembly of mechanical parts, because dimensions, angularity, and planarity cannot be made perfectly. In practice, machine designers define tolerances (i.e., tolerable deviations from perfection) on dimensions, angularity, and planarity, and when these imperfect parts are assembled, misalignments result.

Such misalignments may completely eliminate the physical clearance between a reciprocating body and its cylinder. The resulting mechanical contact causes friction, wear, and, in extreme cases, the seizing of the reciprocating body in its cylinder. Such mechanical contact may be lubricated by contact bearings, but the associated frictional energy dissipation degrades the efficiency of the transducer and the associated mechanical wear reduces its required maintenance interval or service life.

In electromagnetic electromechanical transducers (such as those described in U.S. Pat. Nos 4,346 318 4,349,757, 4,454,426, 4,602,174, and 4,623,808), misalignment of the reciprocating body of the transducer introduces a radial magnetic force which increases the misalignment and thereby the force until the reciprocating and stationary parts are pulled tightly into unwanted mechanical contact.

In thermomechanical transducers (such as those described in U.S. Pat. Nos. 3,937,600, 3,947,155, 4,036,018, 4,179,630, 4,353,220, 4,538,964, 4,545,738, 4,644,851, 4,649,283, 4,721,440, 4,836,757, and 4,862,695) having a clearance seal between the reciprocating body and its cylinder, any eccentricity due to misalignments reduces the resistance to fluid flow through the clearance seal. If the reciprocating body is a piston, the increased flow of fluid through the clearance seal reduces the compression ratio achieved by the piston. If the reciprocating body is a displacer that pushes fluid through a system of heat exchangers, the increased flow of fluid through the clearance seal reduces the effectiveness of the intended heat transfer process.

Gas bearings (such as those described by J. W. Powell in Design of Aerostatic Bearings and elsewhere, and in U.S. Pat. No. 2,907,304, 3,127,955, 4,545,738, and 4,644,851) are desirable in thermomechanical and electromechanical transducers having one or more sprung oscillating bodies and in which energy efficiency and long service life are important, because they eliminate mechanical contact, friction and wear between the running surfaces of reciprocating bodies and their cylinders. Practical gas bearings cannot generate large radial forces for restoring a misaligned reciprocating body's axis of reciprocation acceptably close to the axis of geometric symmetry in such transducers, however, without dissipating an excessive amount of power, thereby degrading the energy efficiency of the transducer. The present invention reduces the amount of radial force that gas bearings must exert, and therefore the amount of power that they must dissipate, during operation to restore a misaligned reciprocating body's axis of reciprocation acceptably close to the axis of geometric symmetry in such transducers.

BRIEF DESCRIPTION OF THE INVENTION

The present invention is an improved mechanical transducer having an oscillating body reciprocating within a cylinder along, nominally, an axis of geometric symmetry, with an axially compliant spring, an axially stiff, radially compliant member, and a fluid bearing. The present invention differs from prior art devices in selectively interposing the axially stiff, radially compliant member between other mechanical parts so as to reduce the amount of radial force that the fluid bearing must exert upon the reciprocating body to restore its actual axis of reciprocation acceptably close to the transducer's axis of geometric symmetry, thereby preventing undesired mechanical contact between the reciprocating body and its cylinder as well as undesired reduction in the resistance to fluid flow through the reciprocating body's clearance seal.

Figure 1:
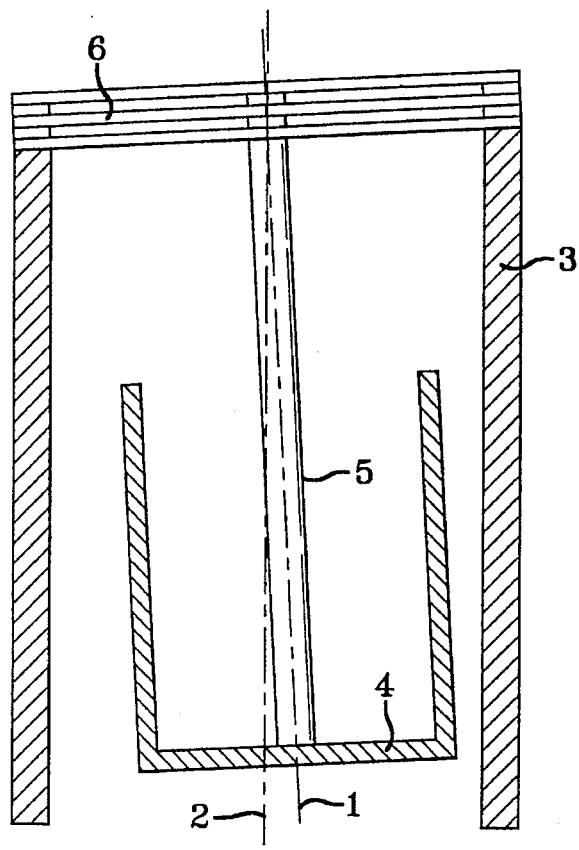
FIG. 1 is a simplified schematic drawing in axial section illustrating how one of many types of misalignment can cause a sprung, oscillating body to reciprocate along an axis other than the axis of geometric symmetry.

In describing the preferred embodiments of the invention which is illustrated in the drawings, specific terminology is resorted to for the sake of clarity. However, it is not intended that the invention be limited to the specific terms so selected and it is to be understood that each specific term includes all technical equivalents which operate in a similar manner to accomplish a similar purpose. In particular, the cross-section through the transducer's axis of geometric symmetry showing a cylinder and its mating reciprocating body may be a triangle square pentagon hexagon, any other regular or irregular polygon, or it may be circular, elliptical, or any other closed curve.

DETAILED DESCRIPTION

It is useful to review some terminology used by those skilled in the art and used in connection with the following description of the invention. Wherever it is used herein, the term mechanical transducers means all types of reciprocating transducers that interconvert mechanical energy with other types of energy. Specifically, but not exclusively, included are thermomechanical transducers in the form of free-piston Stirling engines, which convert high temperature thermal energy to mechanical energy, and thermodynamic transducers in the form of free-piston Stirling coolers, which do mechanical work to absorb thermal energy at a low temperature and to reject it at a warmer temperature. Also specifically included are linear compressors which do mechanical work to elevate the pressure of a gas or to transport a fluid. Electromagnetic, electromechanical transducers in the form of linear electric alternators, which convert mechanical energy to electrical energy, and linear electric motors, which convert electrical energy to mechanical energy, are also specifically included.

In such mechanical transducers, an axially compliant spring is utilized to substantially resonate the reciprocating mass in order to increase the efficiency with which energy is interconverted. In some cases, the mass-spring relationships are not exactly resonant due to other practical considerations such as for example the desire to maximize power transfer, but all cases are substantially within the so-called resonant peak of the frequency response of the mechanical transducer. Thus, the power factor in an off-resonant mechanical transducer is not exactly 1.0, but it is usually greater than 0.5. Axially compliant springs commonly used include mechanical springs, such as a helical coil, gas springs and electromagnetic springs.

In such mechanical transducers, the term compliance refers to the amount of deflection that a mechanical part undergoes as it changes shape in response to an applied force. The term stiffness refers to the inverse of compliance, that is, the amount of force required to deflect a mechanical part through a particular distance. Thus, a compliant member is a mechanical part which deflects a relatively large distance, compared to the distance through which a stiff member is deflected by an applied force. Furthermore, a mechanical part may be shaped so that it is compliant in its response to forces applied in one direction and stiff in its response to forces applied in another direction. A thin solid rod firmly attached to an immovable object at one end, for example, is compressed much less axially than it is bent laterally when a particular force is applied in those directions. Thus, a thin rod may be said to be axially stiff and laterally compliant.

In such mechanical transducers, helical springs have been used in the past to substantially resonate the reciprocating mass, but compression of a helical spring is accompanied by a tilting of its longitudinal axis at an angle with respect to the longitudinal axis through the relaxed spring. When a laterally constrained helical spring is compressed, it exerts a lateral force against that constraint, and this lateral force is proportional to the axial stiffness of the spring. When the lateral constraint is the cylinder within which a piston connected to the spring reciprocates, that lateral force presses the piston against the cylinder wall causing friction and wear. Any fluid bearing intended to prevent this friction and wear must overcome this lateral force, dissipating power proportional to the force as it does so. As, for reasons of design, the reciprocation frequency of a piston of a given mass increases, the axial stiffness of the required spring, the associated lateral force, and fluid bearing power dissipation increase with the square of the frequency.

Theoretically, the interposition of a radially compliant member between a helical spring and a piston, or between a helical spring and a housing connected to the cylinder, reduces the amount of force that the fluid bearing must apply to the amount required to bend the radially compliant member. In practice, though, the degree of bending in a compliant member used with a single helical spring is so large that the danger of buckling the compliant member, which is also under an axial compressive load of hydrostatic and inertia forces associated with the reciprocation of the piston, is unacceptably large.

When the lateral constraint on a helical spring is a rigid mechanical connection to other helical springs symmetrically spaced around a common axis of geometric symmetry parallel to the axes of geometric symmetry of the individual springs then there exists a rotational orientation of the individual springs such that their lateral forces tend to cancel so that the lateral displacement of the group of springs as a whole, and the lateral force needed to bend a radially compliant member to undergo this displacement, are small enough that the risk of buckling the radially compliant member is also small.

In practice, the sprung, oscillating body of a mechanical transducer reciprocates along an axis other than the axis of geometric symmetry of the transducer for two reasons: 1) the gravitational weight of the reciprocating body and 2) misalignments within the reciprocating body's suspension system. Usually, the gravitational displacement of the axis of reciprocation can be overcome by fluid bearings with little power dissipation. The present invention specifically reduces the influence of mechanical misalignments upon the axis of reciprocation. The amount of force that fluid bearings must exert to overcome these misalignments is directly related to the radial stiffness of the overall structure suspending the reciprocating body within its cylinder. In the present invention, the axially stiff, radially compliant member within the suspension system controllably reduces this stiffness to that of the radially compliant member.

FIG. 1 illustrates in axial cross-section how a misalignment (exaggerated for clarity) can cause a sprung, oscillating body to reciprocate along an axis 1 far from the axis of geometric symmetry 2 of a thermomechanical or electromagnetic, electromechanical transducer. In FIG. 1, the oscillating body is a piston 4 and the width of the clearance gap between the piston 4 and its surrounding cylinder 3 formed in a housing has been exaggerated for clarity. A piston, by definition is a reciprocating body with a pressure difference across it axially. In the mechanical transducers in which the invention described wherein may be applied, the reciprocating body may also be a displacer, which, by definition, is a reciprocating body with a temperature difference across it axially. The reciprocating body may also be a magnet paddle, moving coil, or moving iron of a linear alternator or motor.

The right angle on one end of cylinder 3 in FIG. 1 is imperfectly manufactured in that its end deviates from a plane at a right angle with the axis of geometric symmetry 2. Piston 4 is suspended within a chamber formed as cylinder 3 by means of an axially and radially stiff rod 5 from planar spring 6 which resonates the reciprocating mass of all these parts and which is stiffly attached to the imperfectly manufactured end of cylinder 3. As a result, the actual axis of reciprocation 1 is far from the axis of geometric symmetry 2 and a large radial force would have to be exerted against the piston 4 in order to restore its axis of reciprocation 1 acceptably close to the axis of geometric symmetry.

Figure 2:
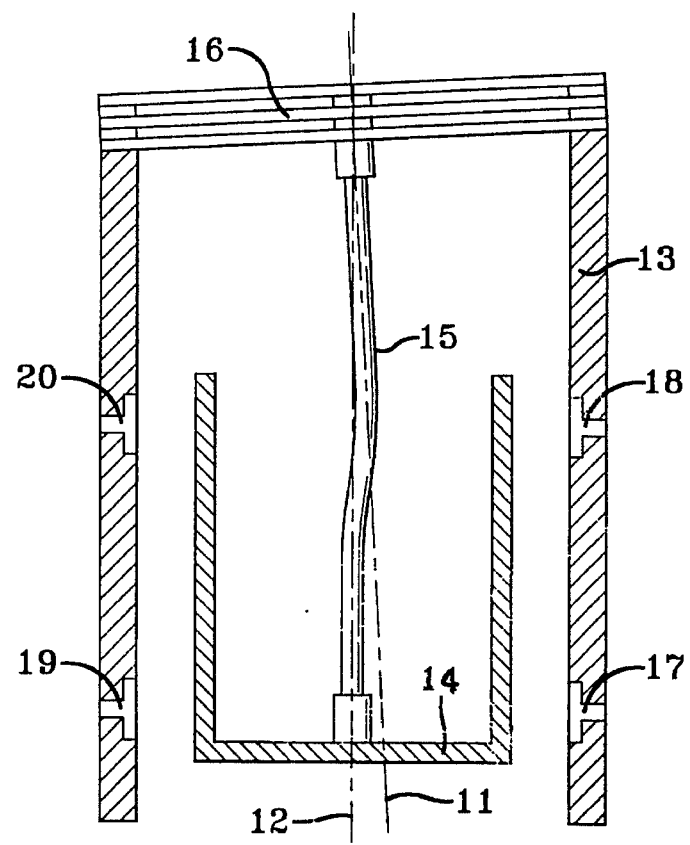
FIG. 2 is a schematic diagram in axial section illustrating in its most simplified form the basic principle of operation of embodiments of the invention.

FIG. 2 illustrates in axial section the basic principle of operation of embodiments of the invention in its most simplified form. As in FIG. 1, the right angle on one end of cylinder 13 is imperfectly manufactured in that its end deviates from a right angle with its axis of geometric symmetry. In this case, however, an axially stiff, radially compliant rod 15 is interposed between piston 14 and planar spring 16. As a result, the small force exerted against piston 14 by fluid flowing from the fluid bearing cavities 17, 18, 19, and 20 into the clearance gap between piston 14 and cylinder 13 during operation of the transducer is capable of restoring the axis of reciprocation 11 of piston 14 acceptably to the axis of geometric symmetry 12.

Figure 3A:
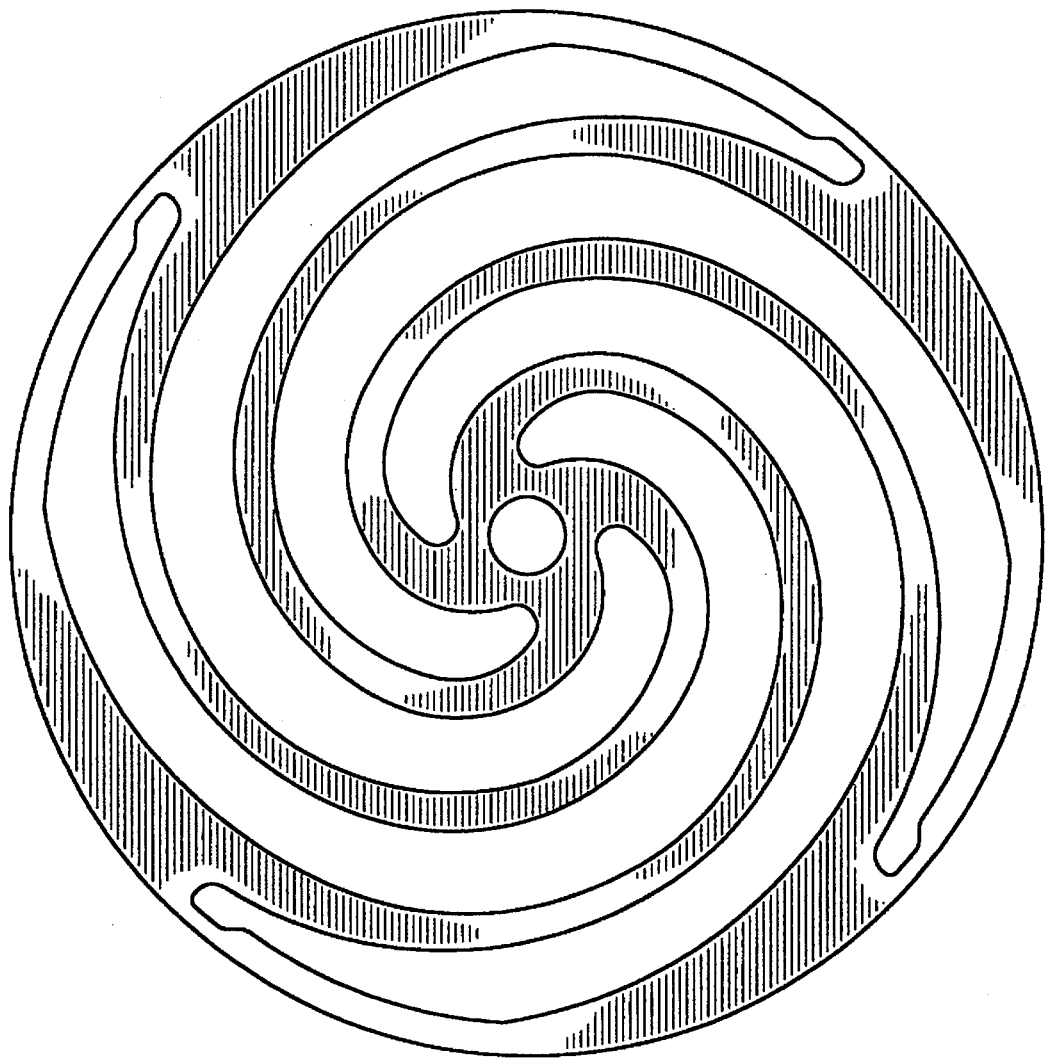
FIGS. 3A and 3B show plan and edge views of a planar spring which is the preferred axially compliant member of the invention.
Figure 3B:
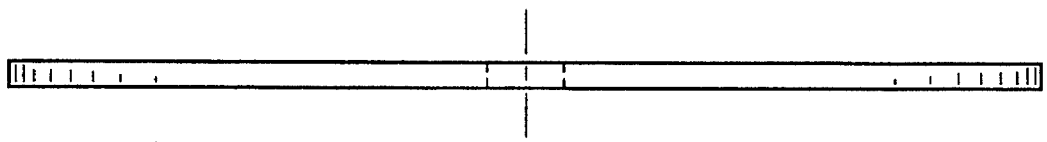

FIG. 3A and FIG. 3B show a plan view and a lateral side view, respectively, of a planar spring. A planar spring is a multiplicity of beams in a plane which store mechanical energy as the beams undergo a common deflection perpendicular to the plane. The planar spring shown in FIG. 3A has four such beams. The planar spring of FIG. 3 has a diameter of approximately 134 mm and a thickness of approximately 2 mm. It is constructed of one of the following AISI carbon steels: 1035, 1045, 1055, 1075, 4140 or 4130.

Figure 4C:
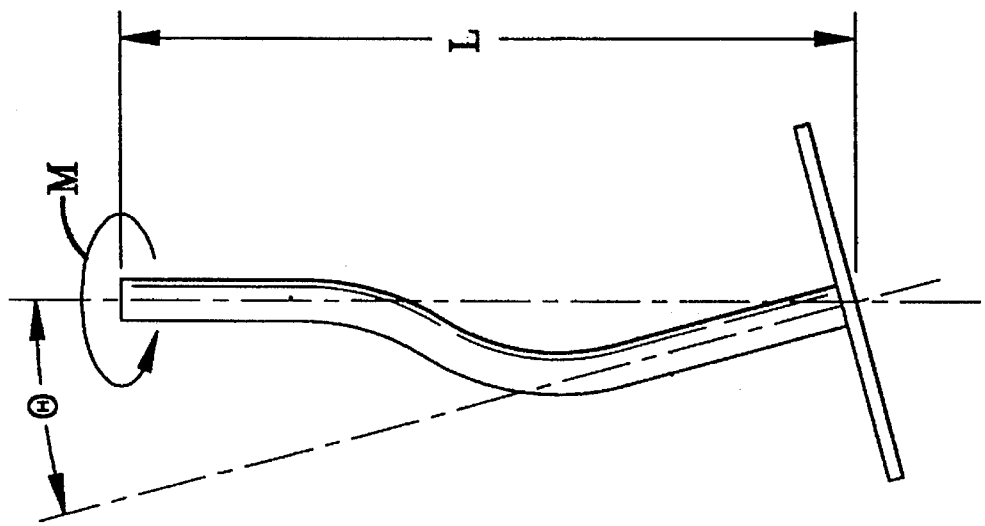
FIGS. 4A, 4B and 4C are diagrammatic axial views illustrating two components of lateral compliance in the axially stiff, laterally compliant member of the invention.
Figure 4B:
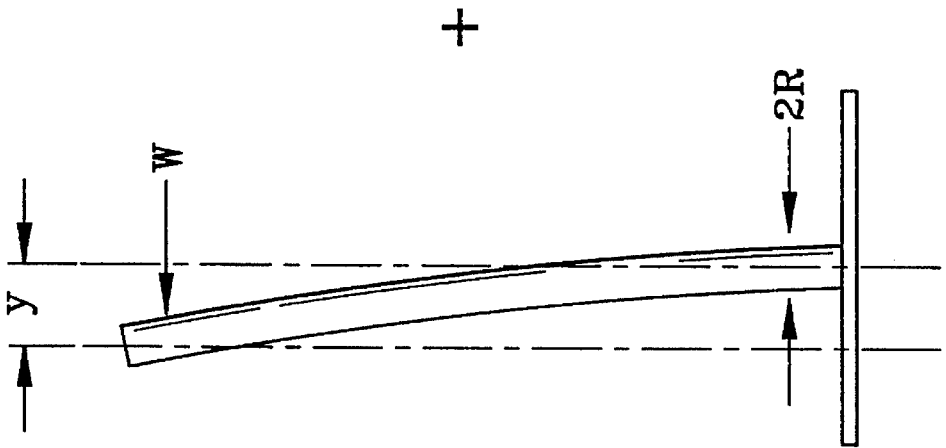
Figure 4A:
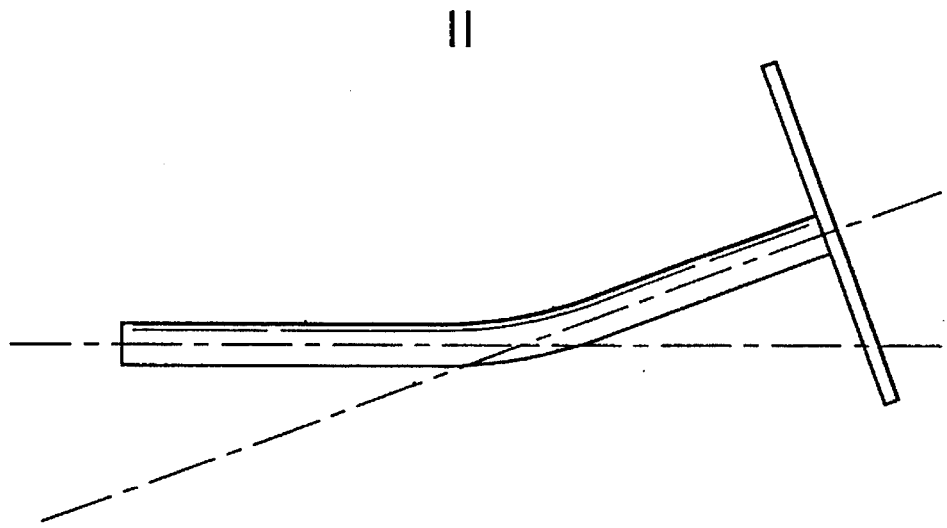

FIG. 4 shows a solid, axially stiff, laterally compliant rod for which the lateral compliance is analyzed below. Other cases could be analyzed by reference to standard mechanical engineering texts such as Roark's Formulas for Stress and Strain. The lateral compliance $C_L$ of the rod shown in FIG. 4A has two components, translational shown in FIG. 4B and angular shown in FIG. 4C The translational component $C_y$ of compliance refers to the translational displacement y of the free end of the rod, whereas the angular component $C_\theta$ of compliance refers to the angular displacement $\theta$ of the free end:

$$C_L = C_y + C_\theta$$

The translational component $C_y$ of radial compliance is:

$$C_y = y/W = L^3/3EI$$

where
y=the lateral displacement of the end of the rod attached to the piston,
W=a lateral force,
E=the Young's modulus of the rod material, and
I=the moment of inertia of the rod.
In the case of a rod of radius R, $$I = \pi R^4/4$$

The angular component $C_\theta$ of lateral compliance is:

$$C_\theta = \theta/M = L/4EI$$

where
$\theta$=the angular displacement of the free end of the rod,
L=the length of the rod, and
M=an applied moment, that is, a pair of forces acting along separate parallel lines in opposite directions.

To minimize a gas bearing's power dissipation in a mechanical transducer, the lateral compliance of the rod is designed to be the maximum possible without danger of the rod buckling under the applied axial force F, which arises from thermodynamics and inertia in mechanical transducers such as are the subject of the present invention. The bucking load $F_b$ of a solid rod is $$F_b = \pi^2 EI/4L^2$$

To identify the conditions for the desired high lateral compliance for a particular buckling load, the ratio of each component of lateral compliance to the buckling load is examined separately. Substitution of the above equations yields the following expressions for these ratios:

$$C_y/F_b = (64/3\pi^2) \cdot (L^5/R^8) \cdot (1/E^2)$$

$$C_\theta/F_b = (16/\pi^2) \cdot (L^3/R^8) \cdot (1/E^2)$$

By inspection, the desired high compliances per unit buckling strength are obtained by fabricating long narrow rods of materials with small Young's moduli.

Figures of merit $\Phi_y$ and $\Phi_\theta$ with units of $Pa^{-2}$ (Pa= Pascals) for a given design may be defined as $$\Phi_y = L^5/R^8E^2$$
$$\Phi_\theta = L^3/R^8E^2$$

Derivations for the figures of merit for laterally compliant and stiff aluminum and stainless steel rods respectively, for a particular linear compressor are shown in the following table:

|  | L (cm) | R (mm) | E ($\times 10^{11}$ Pa) | $\Phi_y$ ($Pa^{-2}$) | $\Phi_\theta$ ($Pa^{-2}$) |
| --- | --- | --- | --- | --- | --- |
| Compliant | 6.0 | 1.5 | 0.7 | $10^{-14}$ | $10^{-18}$ |
| Stiff | 2.0 | 3.0 | 2.4 | $10^{-18}$ | $10^{-23}$ |

In practice, an engineer would allow a safety factor in designing the rod to be strong enough to support a buckling load $F_b$, say, 3 times the applied axial force F. Then the engineer would choose the rod's, length, radius, and material so as to maximize the figures of merit, within whatever limits may be imposed by other design constraints.

Figure 5:
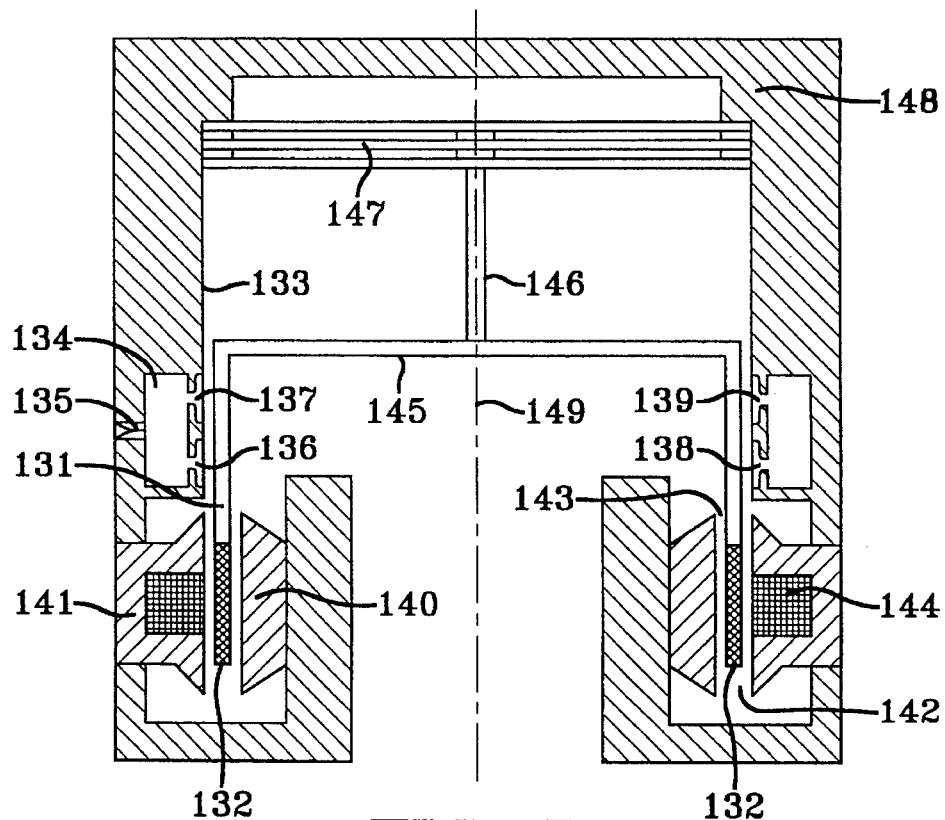
FIG. 5 is a schematic diagram in axial section of an embodiment of the invention of a type illustrated in FIG. 2.

FIG. 5 illustrates in axial section a practical embodiment of the invention in which an electromagnetic electromechanical transducer has a sprung, oscillating magnet paddle reciprocating within a radially adjacent cylinder. In this embodiment, the mechanical transducer is an electromagnetic, electromechanical transducer functioning as a permanent magnet linear motor. The reciprocating body of the transducer is the magnet paddle 131 carrying the permanent magnets 132 of the linear motor. The magnet paddle 131 reciprocates relative to the radially adjacent cylinder 133.

Pressurized fluid from an external source enters the pressure chamber 134 through the one-way valve 135 and exits into the clearance gap between the magnet paddle 131 and cylinder 133 through passageways 136, 137, 138, and 139 and providing a fluid bearing. The magnets 132 of the linear motor which reciprocate relative to an inner flux loop member 140 and an outer flux loop member 141 comprised of high permeability material which constitute together a magnetic flux path with two gaps 142 and 143 around an armature coil of electrically conductive wire 144. The magnet paddle 131 is connected by means of a stiff cross-member 145 and an axially stiff, radially compliant solid rod 146 to a planar spring 147. The planar spring 147 is connected to a stiff housing 148, which is stiffly connected to the cylinder 133. The radially compliant member 146 reduces the radial force that fluid flowing out of fluid bearing passageways 136, 137, 138, and 139 must generate to restore the axis of reciprocation acceptably close to the axis of geometric symmetry 149.

Figure 6:
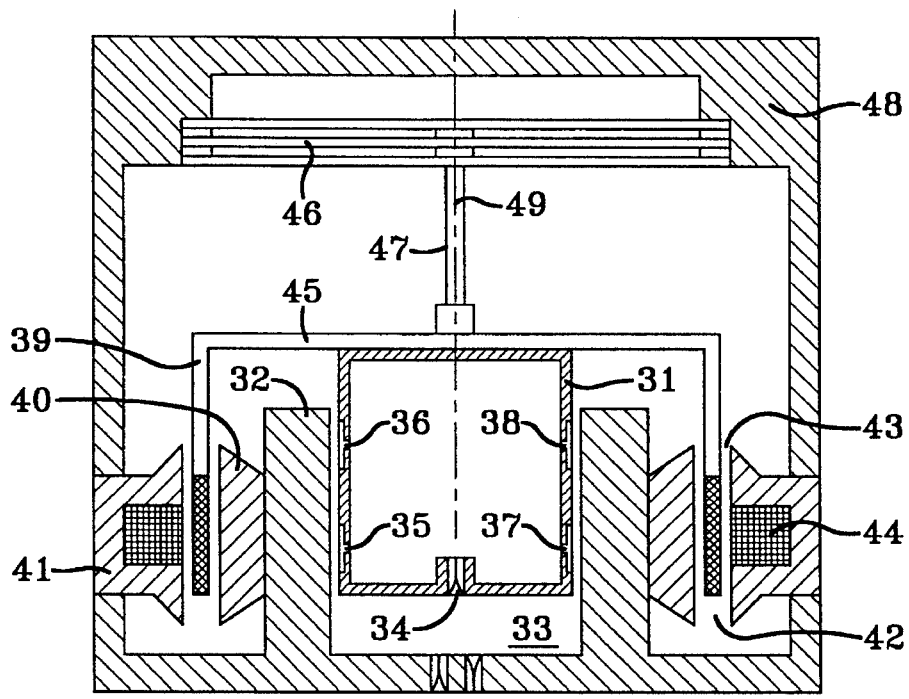
FIG. 6 is a schematic diagram in axial section of the preferred embodiment of the invention of a type illustrated in FIG. 2.

FIG. 6 illustrates in axial cross-section the preferred practical embodiment of the invention in which a thermomechanical transducer is mechanically connected to an electromagnetic, electromechanical transducer, both having sprung, oscillating bodies reciprocating with respect to a radially adjacent cylinder. In this embodiment, the thermomechanical transducer is a free-piston compressor and the electromagnetic, electromechanical transducer is a permanent magnet linear motor. The reciprocating body of the compressor is a hollow piston 31 which reciprocates relative to a radially adjacent cylinder 32. The interior of the piston 31 serves as a source of pressurized fluid for a fluid bearing. Fluid enters piston 31 from the compression space 33 through the one-way valve 34 and exits into the clearance gap between the piston 31 and cylinder 32 through passageways 35, 36, 37, and 38. The reciprocating body of the linear motor is its magnet paddle 39 which reciprocates relative to its inner flux loop member 40 and its outer flux loop member 41 which constitute together a magnetic flux path with two gaps 42 and 43 around an armature coil of electrically conductive wire 44. The two reciprocating bodies 31 and 39 are connected to one another by means of a stiff cross-member 45 and to a multiplicity of planar springs 46 by means of an axially stiff, radially compliant solid rod 47. The planar spring is connected to a stiff housing 48, which is stiffly connected to cylinder 32. The radially compliant member 47 reduces the radial force that fluid flowing out of fluid bearing passageways 35, 36, 37, and 38 must generate to restore the axis of reciprocation acceptably close to the axis of geometric symmetry 49.

Figure 7:
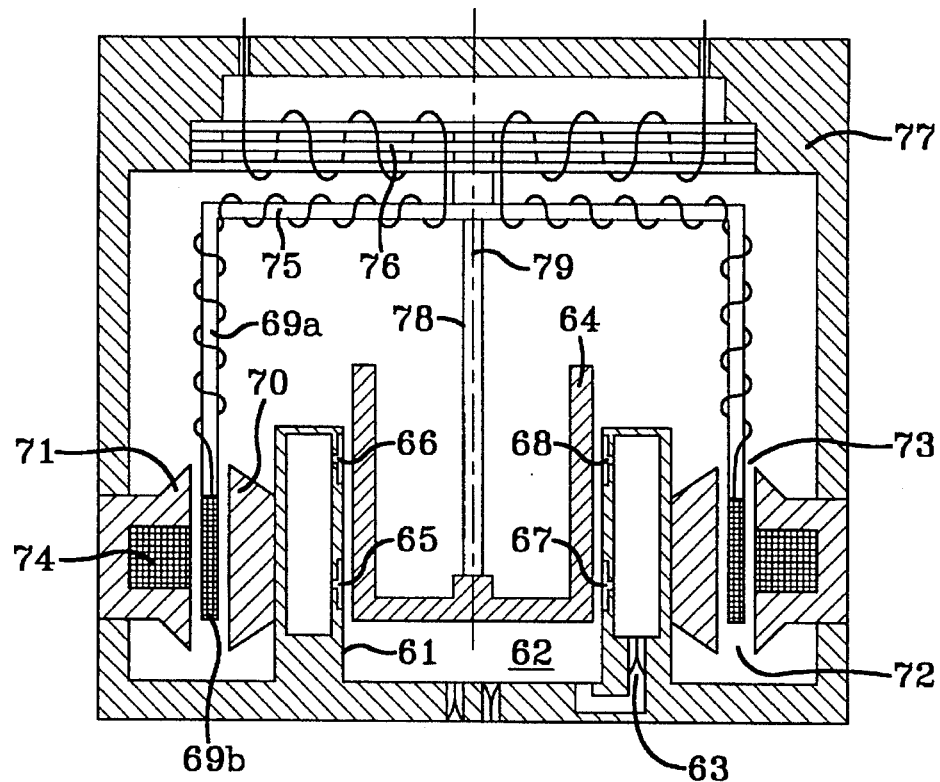
FIG. 7 is a schematic diagram in axial section of an alternative embodiment of the invention of a type illustrated in FIG. 2.

FIG. 7 illustrates in axial section an alternative practical embodiment of the invention in which a thermomechanical transducer is mechanically connected to an electromagnetic, electromechanical transducer, both having sprung, oscillating bodies reciprocating relative to a radially adjacent cylinder. Again the thermomechanical transducer is a free-piston compressor and the electromagnetic electromechanical transducer is a linear motor. In this embodiment, however, the cylinder 61 of the compressor is hollow containing a source of pressurized fluid for a fluid bearing. Fluid enters the hollow interior of cylinder 61 from the compression space 62 through the one-way valve 63 and exits into the clearance gap between the reciprocating piston 64 and cylinder 61 through passageways 65, 66, 67, and 68. In this embodiment, the reciprocating body of the linear motor is the support structure 69a for a field coil of electrically conductive wire 69b which reciprocates relative to the inner and outer flux loop members 70 and 71 which constitute together a magnetic flux path with two gaps 72 and 73 around an armature coil of electrically conductive wire 74. A stiff cross-member 75 connects the field coil 69b and its support structure 69a of the linear motor to the central region of a multiplicity of planar mechanical springs 76, the peripheral region of which is connected to the stiff housing 77, which is stiffly connected to the cylinder 61. The stiff cross member 75 is connected to the piston 64 of the compressor by means of an axially stiff, radially compliant rod 78. Again, the radially compliant member 78 reduces the radial force that fluid flowing out of fluid bearing passageways 65, 66, 67, and 68 must generate to restore the axis of reciprocation acceptably close to the axis of geometric symmetry 79.

Figure 8:
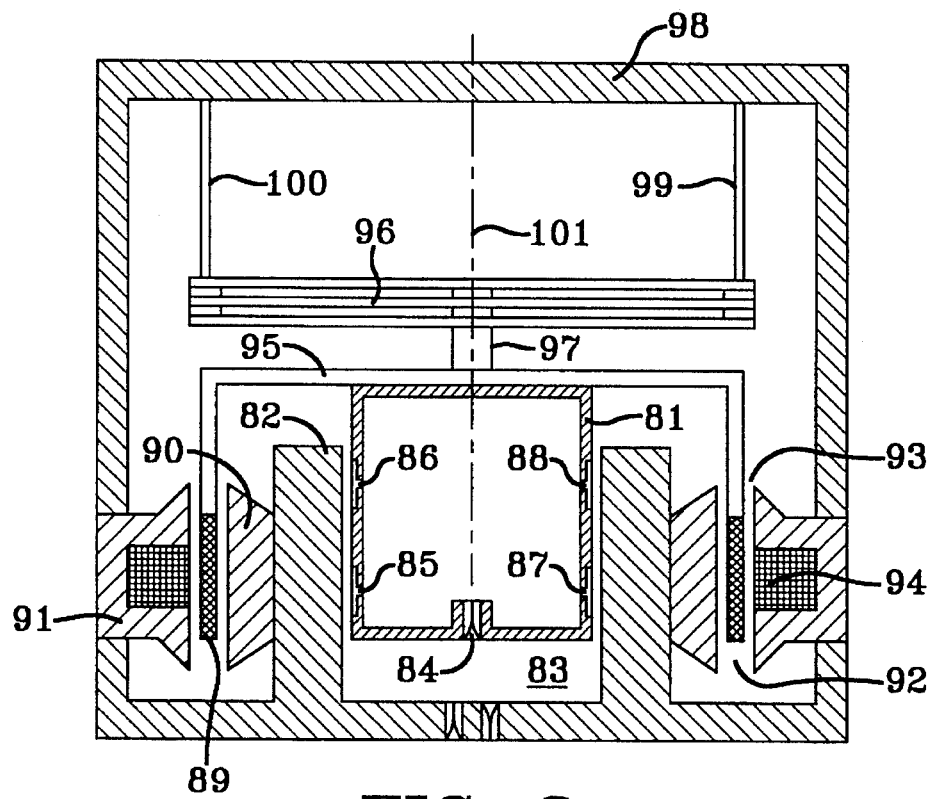
FIG. 8 is a schematic diagram in axial section of another alternative embodiment of the invention of a type illustrated in FIG. 2.

FIG. 8 illustrates in axial section another practical embodiment of the invention in which a thermomechanical transducer is mechanically connected to an electromagnetic, electromechanical transducer, both having sprung, oscillating bodies reciprocating within radially adjacent cylinders. Again, the thermomechanical transducer is a free-piston compressor and the electromagnetic, electromechanical transducer is a linear motor. As in FIG. 6, the reciprocating body of the compressor is a hollow piston 81 which reciprocates relative to a radially adjacent cylinder 82. Again, the interior of the piston 81 serves as a source of pressurized fluid for a fluid bearing, with fluid entering piston 81 from the compression space 83 through the one-way valve 84 and exiting into the clearance gap between the piston 81 and cylinder 82 through passageways 85, 86, 87, and 88. Again, the reciprocating body of the linear motor is a ring of magnets 89 which reciprocates relative to inner and outer cylinders 90 and 91 comprised of high permeability material which constitute together a magnetic flux path with two gaps 92 and 93 around an armature coil of electrically conductive wire 94. Again, the two reciprocating bodies 81 and 89 are connected to one another by means of a stiff cross-member 95. In this embodiment, however, the stiff cross-member 95 is connected to the central region of a common planar spring 96 by means of an axially and radially stiff solid rod 97 and the peripheral region of the planar spring 96 is connected to the stiff housing 98 by means of a multiplicity of axially stiff, radially compliant rods 99, 100 and others not visible in this axially cross-sectional view. The stiff housing 98 is also connected to the inner and outer cylinders 90 and 91 as well as to cylinder 82. Again, the radially compliant member consisting of rods 99, 100 etc. reduces the radial force that fluid flowing out of fluid bearing passageways 85, 86, 87, and 88 must generate to restore the axis of reciprocation acceptably close to the axis of geometric symmetry 101.

Figure 9:
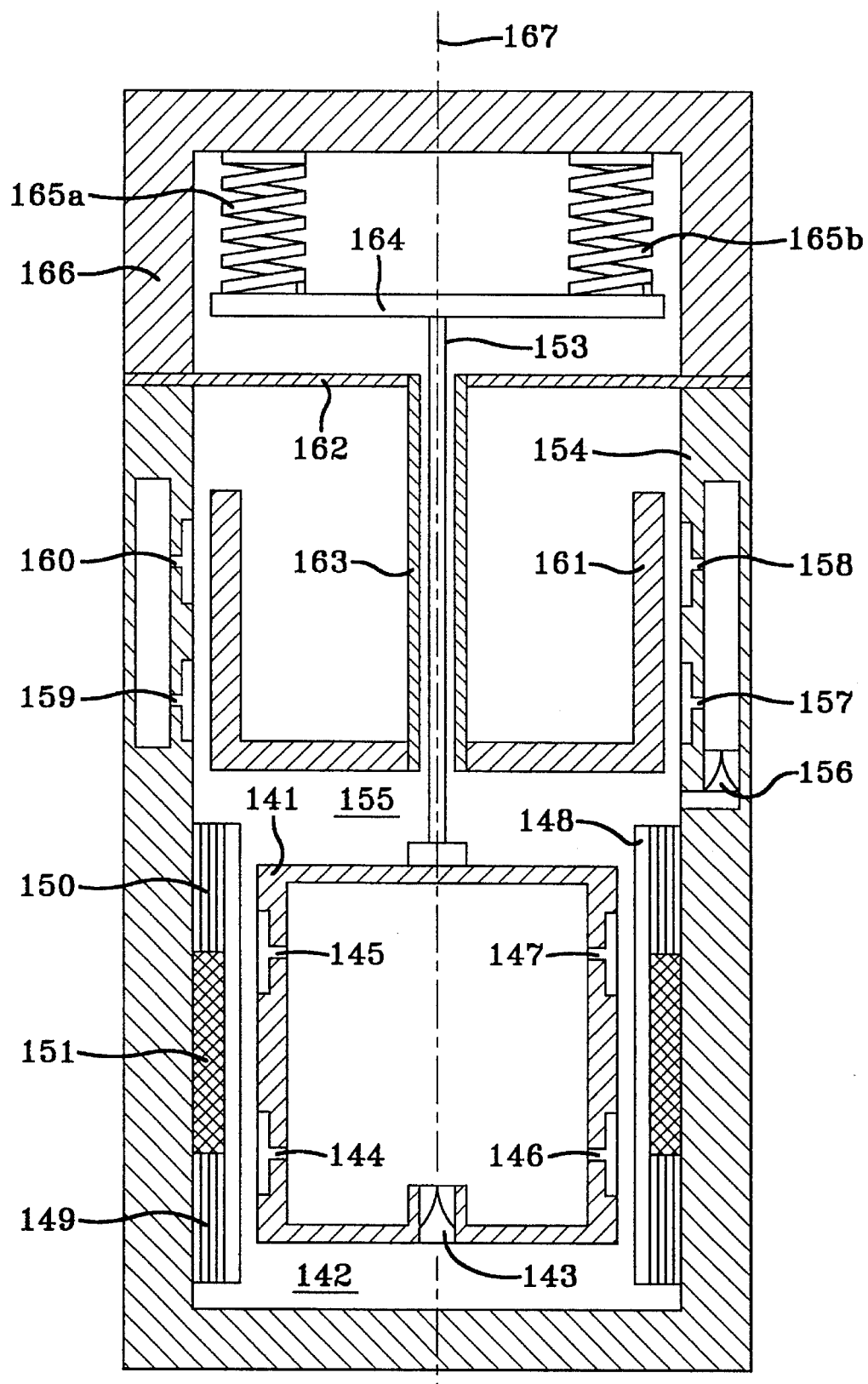
FIG. 9 is a schematic diagram in axial section of another alternative embodiment of the invention of a type illustrated in FIG. 2.

FIG. 9 illustrates in axial section another practical embodiment of the invention in a free-piston Stirling engine, having two sprung, oscillating bodies reciprocating relative to radially adjacent, axially in-line cylinders. One oscillating body is a hollow displacer 141 which contains a source of positively pressurized fluid for a fluid bearing, with fluid entering the hollow interior of displacer 141 from the expansion space 142 through the one-way valve 143. The fluid exits through passageways 144, 145, 146, and 147 into the clearance gap between the displacer 141 and the displacer cylinder 148. Reciprocation of the displacer 141 shuttles fluid back and forth through the heat accepting heat exchanger 149, the heat rejecting heat exchanger 150, and regenerator 151. The displacer 141 is connected to a multiplicity of helical mechanical springs 165a and 165b by means of an axially stiff, radially compliant solid rod 153 and a stiff cross member 164. The piston cylinder 154 also contains a source of positively pressurized fluid for a fluid bearing, with fluid entering the hollow interior of piston cylinder 154 from the compression space 155 through the one-way valve 156. The fluid exits through passageways 157, 158, 159, and 160 into the clearance gap between the piston cylinder 154 and the second oscillating body which is a piston 161. Reciprocation of the piston 161 alternately compresses and expands the fluid in the general region comprised of the expansion space 142, the heat accepting heat exchanger 149, the heat rejecting heat exchanger 150, the regenerator 151, and the compression space 155, thereby pneumatically coupling the reciprocation of the displacer 141 to that of the piston 161. The piston 161 is connected to the central region of a single planar mechanical spring 162 by means of an axially stiff, radially compliant hollow rod 163, through which passes the axially stiff, radially compliant solid rod 153 connecting the displacer 141 to the stiff cross member 164 which radially restricts the motion of a spaced multiplicity of helical mechanical springs 165a and 165b. The displacer's multiplicity of helical springs 165a and 165b and the piston's planar spring 162 are both connected to the stiff housing 166, which again is connected to both the displacer's cylinder 148 and to the piston's cylinder 154. Again, the radially compliant members 153 and 163 reduce the radial force that fluid flowing out of displacer's fluid bearing passageways 144, 145, 146, and 147 and the piston's fluid bearing passageways 157, 158, 159, and 160 must generate to restore the axes of reciprocation of the displacer 141 and piston 161 acceptably close to the axis of geometric symmetry 167.

Figure 10:
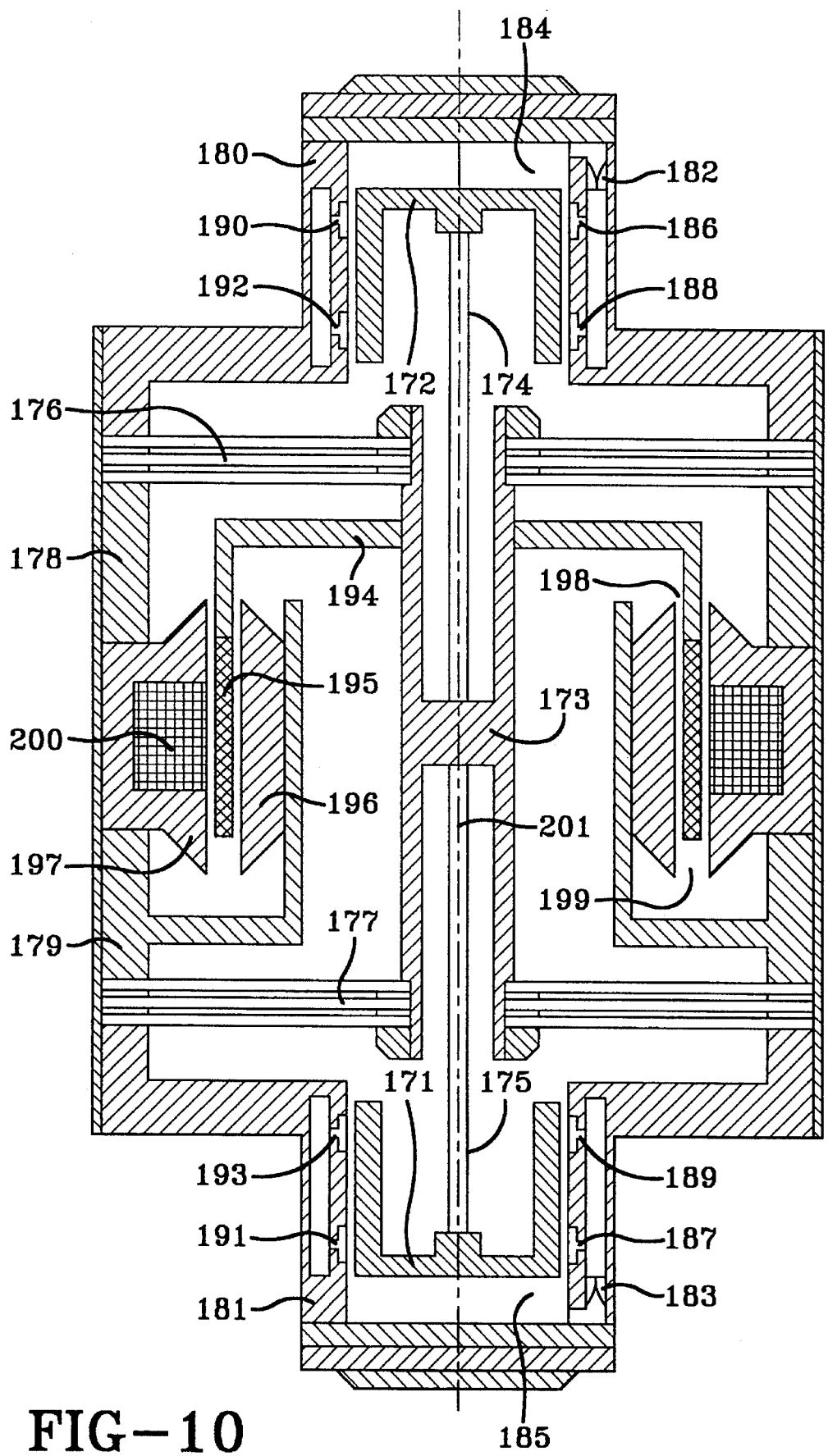
FIG. 10 is a schematic diagram in axial section of another alternative embodiment of the invention of a type illustrated in FIG. 2.

FIG. 10 illustrates in axial section another practical embodiment of the invention in a compressor, having two sprung, oscillating bodies reciprocating relative to radially adjacent, axially in-line cylinders. In this embodiment, pistons 171 and 172 are mechanically connected to the axially and laterally stiff axial member 173 by means of the axially stiff, radially compliant, solid rods 174 and 175. The stiff axial member 173 is mechanically connected to the central regions of planar springs 176 and 177 the peripheral regions of which are connected to the housing parts 178 and 179 which are stiffly connected to cylinders 180 and 181. Pistons 171 and 172 reciprocate relative to the radially adjacent cylinders 180 and 181, the hollow interiors of which serve as sources of pressurized fluid. Fluid enters the hollow interiors of cylinders 180 and 181 through one-way valves 182 and 183 from compression spaces 184 and 185 and exits to the clearance gaps between pistons 171 and 172 and their cylinders 180 and 181 through the passageways 186, 187, 188, 189, 190, 191, 192, and 193. The stiff cross member 194 connects axial member 173 to a ring of magnets 195 which reciprocates relative to the inner and outer cylinders 196 and 197, both of which are comprised of relatively high permeability material and constituting parts of a magnetic flux loop with gaps 198 and 199 surrounding an armature coil of electrically conductive wire 200. The radially compliant members 174 and 175 reduce the radial force that fluid flowing out of the fluid bearing passageways 186, 187, 188, 189, 190, 191, 192, and 193 must generate to restore the axes of reciprocation of the two pistons 171 and 172 acceptably close to the axis of geometric symmetry 201.

Figure 11A:
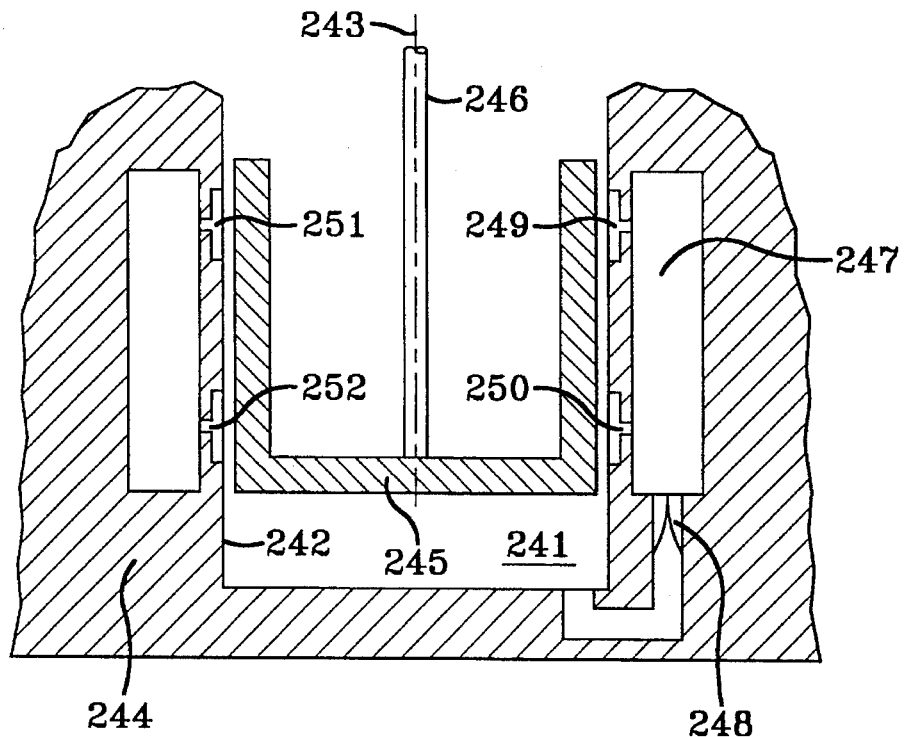
FIGS. 11A and 11B illustrate in axial section two embodiments of a gas spring which can also be employed as the axially compliant member of the invention.

FIG. 11 illustrates in axial cross section two types of gas springs which can be incorporated in the invention. FIG. 11A shows a compression space 241 bounded by the sidewall and end of cylinder 242 within housing 244 and by the puck 245. Cylinder 242 is substantially coaxial with an axis of geometric symmetry 243 along which the puck is to reciprocate. Puck 245 is connected to the reciprocating body of a mechanical transducer via the axially stiff, laterally compliant member 246 Puck 245 is caused to reciprocate along an axis acceptably close to the axis of geometric symmetry 243 by the action of the fluid bearing comprised of the pressure chamber 247, one-way valve 248, and the restricted passageways 249, 250, 251, and 252 all of which are located inside the housing 264.

Figure 11B:
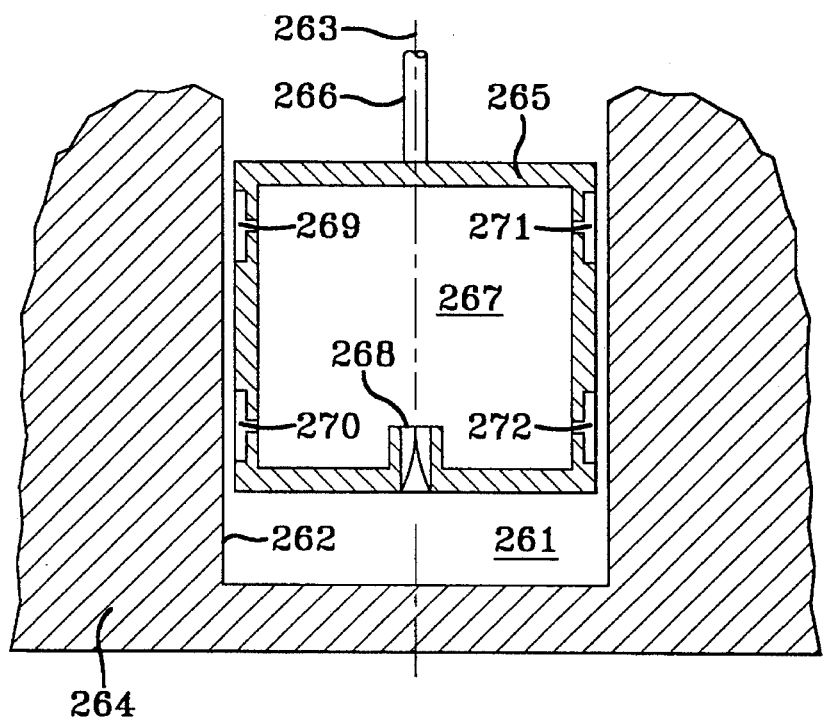

FIG. 11b shows a compression space 261 bounded by the sidewall and end of cylinder 262 within housing 264 and by the hollow puck 265. Cylinder 262 is substantially coaxial with an axis of geometric symmetry 263 along which the puck is to reciprocate. Puck 265 is connected to the reciprocating body of a mechanical transducer via the axially stiff, laterally compliant member 266. Puck 265 is caused to reciprocate along an axis acceptably close to the axis of geometric symmetry 263 by the action of the fluid bearing comprised of the pressure chamber 267, one-way valve 268, and the restricted passageways 269, 270, 271, and 272 all of which are located inside the puck 265.

Figure 12:
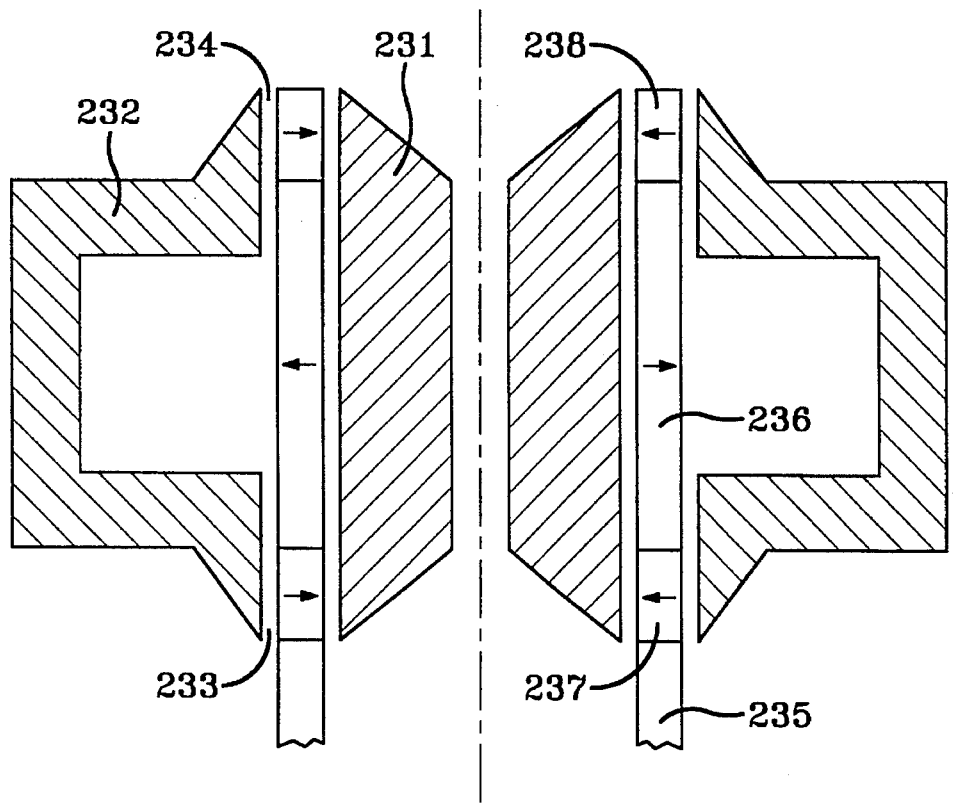
FIG. 12 illustrates in axial section a magnetic spring which can also be employed as the axially compliant member of the invention.

FIG. 12 illustrates in axial cross section a magnetic spring of the type described in detail in U.S. Pat. No. 5,148,066. The magnetic spring is comprised of two magnetic flux loop members 231 and 232 which together comprise a magnetic flux loop with two circular gaps 233 and 234. Reciprocating within the gaps of the flux loop is a magnet paddle 235 holding three magnets. A radially polarized field magnet 236 which establishes an alternating magnetic field within the flux loop as the magnet paddle reciprocates axially within the gaps 233 and 234. On either side of the field magnet 236 are two spring magnets 237 and 238 which are also radially polarized but in the opposite direction to field magnet 236. Axial displacement of the magnet paddle 235 in either direction causes the spring magnets to interact with the magnetic field of the field magnet in such a way as to induce a proportional restoring force upon the magnet paddle. In practical embodiments, the flux loop members 231 and 232 would be attached to the housing and the magnet paddle 235 would be attached via an axially stiff, laterally compliant rod to a reciprocating body. Alternatively, the magnet paddle 235 would be attached via a stiff member to the reciprocating body and the flux loop members would be connected via an axially stiff, laterally compliant member to the housing.

Figure 13:
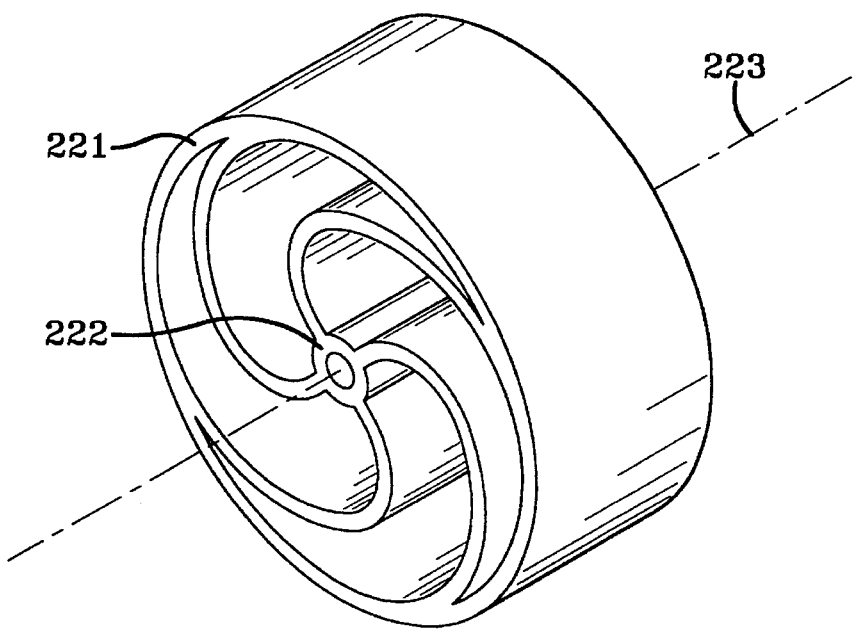
FIG. 13 illustrates in oblique perspective view a special type of planar spring which can be employed as both the axially compliant member and as the radially compliant member of the invention.

FIG. 13 illustrates in oblique view a planar spring which can itself serve as the radially compliant member as well as the axially compliant energy storing element in the invention. In practical embodiments of the invention, the radially peripheral region 221 of the spring is attached to a housing which is stiffly continuous with a cylinder with respect to which the oscillating body reciprocates, while the central region 222 of the spring is attached by means of axially and radially stiff linkage components to the reciprocating body. Alternatively, the peripheral region 221 may be attached to the reciprocating body while the central region 222 is attached to the housing. In embodiments employing such a spring, the axial compliance of the spring substantially resonates the mass of the reciprocating body while the radial compliance of the spring reduces the amount of force that fluid bearings must generate to restore the axis of reciprocation acceptably close to the axis of geometric symmetry 223.

From the above description, it is apparent that the invention may be used with a variety of bodies, including pistons, displacers and magnet paddles, which reciprocate axially in a mating chamber, such as a cylinder or the gap of a magnetic flux loop. The body is linked to the housing, in which the chamber is formed, by a linkage which includes one or more linkage components. At least one linkage component is axially compliant to apply an axial force upon the body usually to tune the system to near resonance. An anti-friction fluid bearing minimizes contact between the chamber wall and the body by applying lateral centering forces upon the body. At least one linkage component is included which has a lateral compliance sufficient for the centering forces of the fluid bearing to at least equal the sum of lateral force exerted on the body by the linkage plus other lateral forces exerted upon the body. This allows the centering forces of the fluid bearing to be effective in moving the body away from the chamber wall and thereby minimize contact and consequent wear.

While certain preferred embodiments of the present invention have been disclosed in detail, it is to be understood that various modifications may be adopted without departing from the spirit of the invention or scope of the following claims.

What is claimed is:

1. An improved mechanical transducer a housing including a chamber defined by at least one wall having an axis of geometric symmetry, the chamber con a substantially axially reciprocating, mating body linked to housing by a linkage including an axially compliant spring applying an axial force upon the body, the transducer having an anti-friction bearing for minimizing contact between the chamber wall and the body, wherein the improvement comprises:
    (a) the bearing being a fluid bearing for applying lateral, centering forces upon the body; and
    (b) the linkage including a component having a lateral compliance sufficient for the centering forces exerted by the fluid bearing to at least equal the sum of all other lateral forces exerted on the body, including the lateral force exerted upon the body by the linkage, during normal operation of the transducer.

2. A transducer in accordance with claim 1, wherein the chamber is a cylinder and the body is a piston.

3. A transducer in accordance with claim 2, wherein the spring is a planar spring oriented orthogonally to the axis.

4. A transducer in accordance with claim 3, wherein the spring comprises a multiplicity of parallel planar springs attached together near their perimeters and near their centers.

5. A transducer in accordance with claim 3, wherein the spring is also said laterally compliant linkage component.

6. A transducer in accordance with claim 2, wherein the spring is a gas spring.

7. A transducer in accordance with claim 2, wherein the spring is a magnetic spring.

8. A transducer in accordance with claim 2, wherein the spring is a multiplicity of at least three interconnected helical springs symmetrically spaced about the axis.

9. A transducer in accordance with claim 2, wherein the laterally compliant linkage component comprises an axially stiff, radially compliant connecting rod.

10. A transducer in accordance with claim 9, wherein the connecting rod is a tube.

11. A transducer in accordance with claim 9, wherein the laterally compliant linkage component comprises a plurality of axially stiff, radially compliant connecting rods symmetrically spaced about the axis.

12. A transducer in accordance with claim 2, wherein the radially compliant linkage component is axially stiff and is interposed between the piston and the spring.

13. A transducer in accordance with claim 2, wherein the laterally compliant linkage component is axially stiff and is interposed between the spring and the housing.

14. A transducer in accordance with claim 1, wherein the body is the magnet paddle of a linear electromagnetic transducer.

* * * * *

UNITED STATES PATENT AND TRADEMARK OFFICE
CERTIFICATE OF CORRECTION

PATENT NO. : 5,525,845
DATED : June 11, 1996
INVENTOR(S) : Beale et al.

It is certified that error appears in the above-indentified patent and that said Letters Patent is hereby corrected as shown below:

Column 11,
In claim 1, line 1, after "transducer" insert --having--; line 2, after "wall" insert --and--; line 3, delete "con" insert --containing--; line 4, after "to" insert --the--.

Signed and Sealed this

Tenth Day of September, 1996

Attest:

BRUCE LEHMAN

*Attesting Officer*  *Commissioner of Patents and Trademarks*